Sept. 11, 1951 H. J. WAECHTER 2,567,305
AUTOGRAPHIC REGISTER
Filed March 15, 1949 3 Sheets—Sheet 1
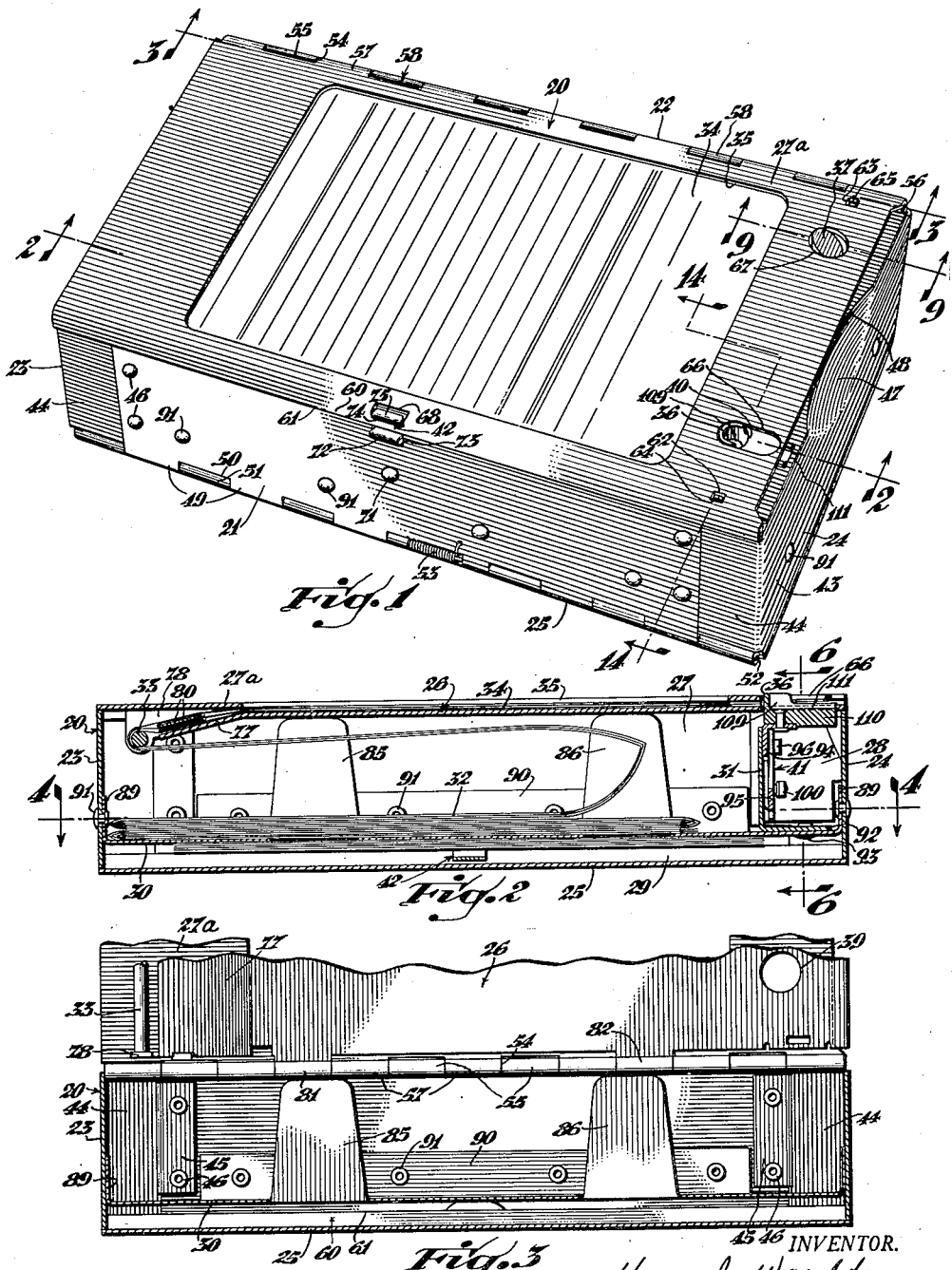
INVENTOR.
Harry J. Waechter
BY
Wood, Arey, Hermon & Evans
ATTORNEYS

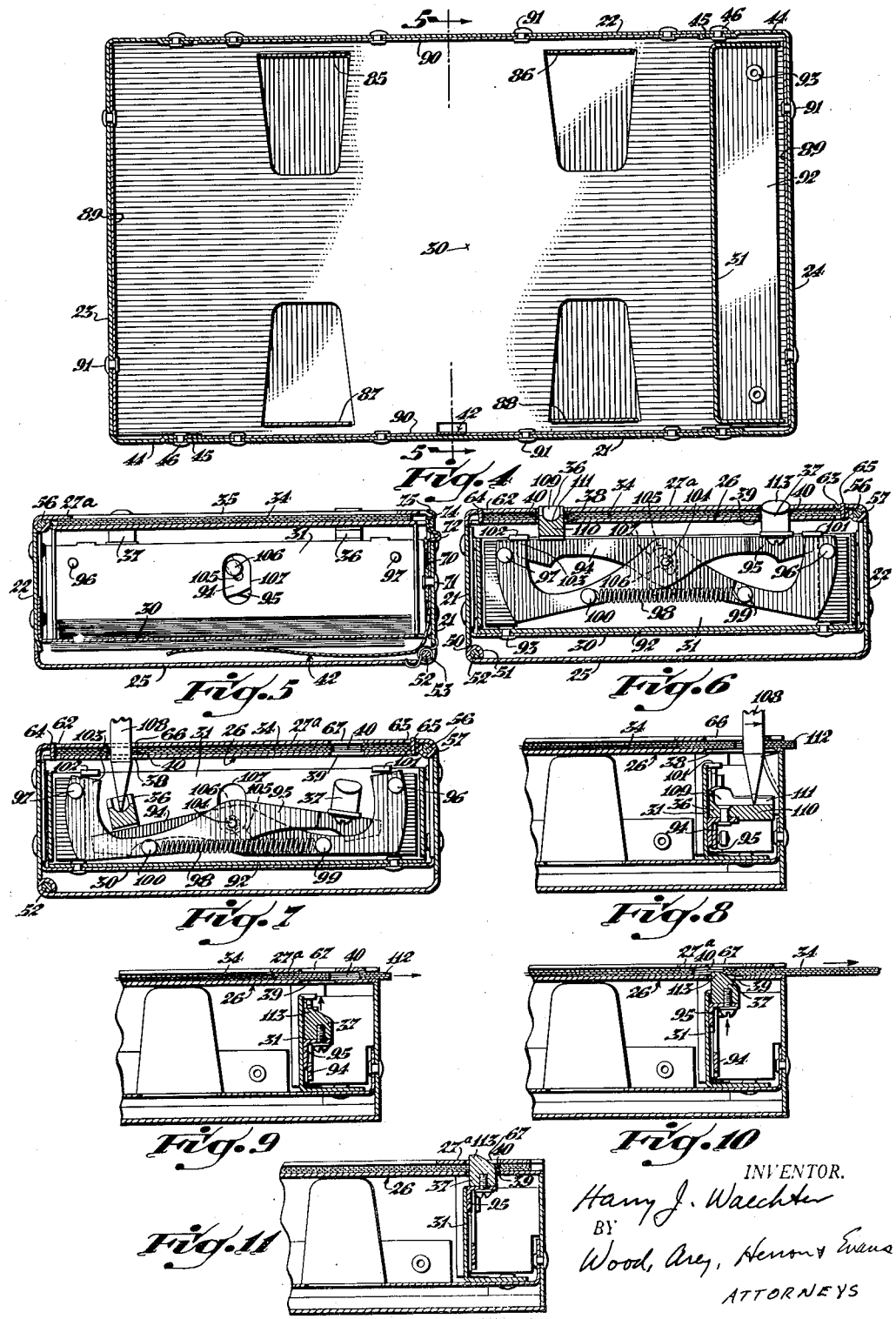

Sept. 11, 1951 H. J. WAECHTER 2,567,305
AUTOGRAPHIC REGISTER
Filed March 15, 1949 3 Sheets-Sheet 3
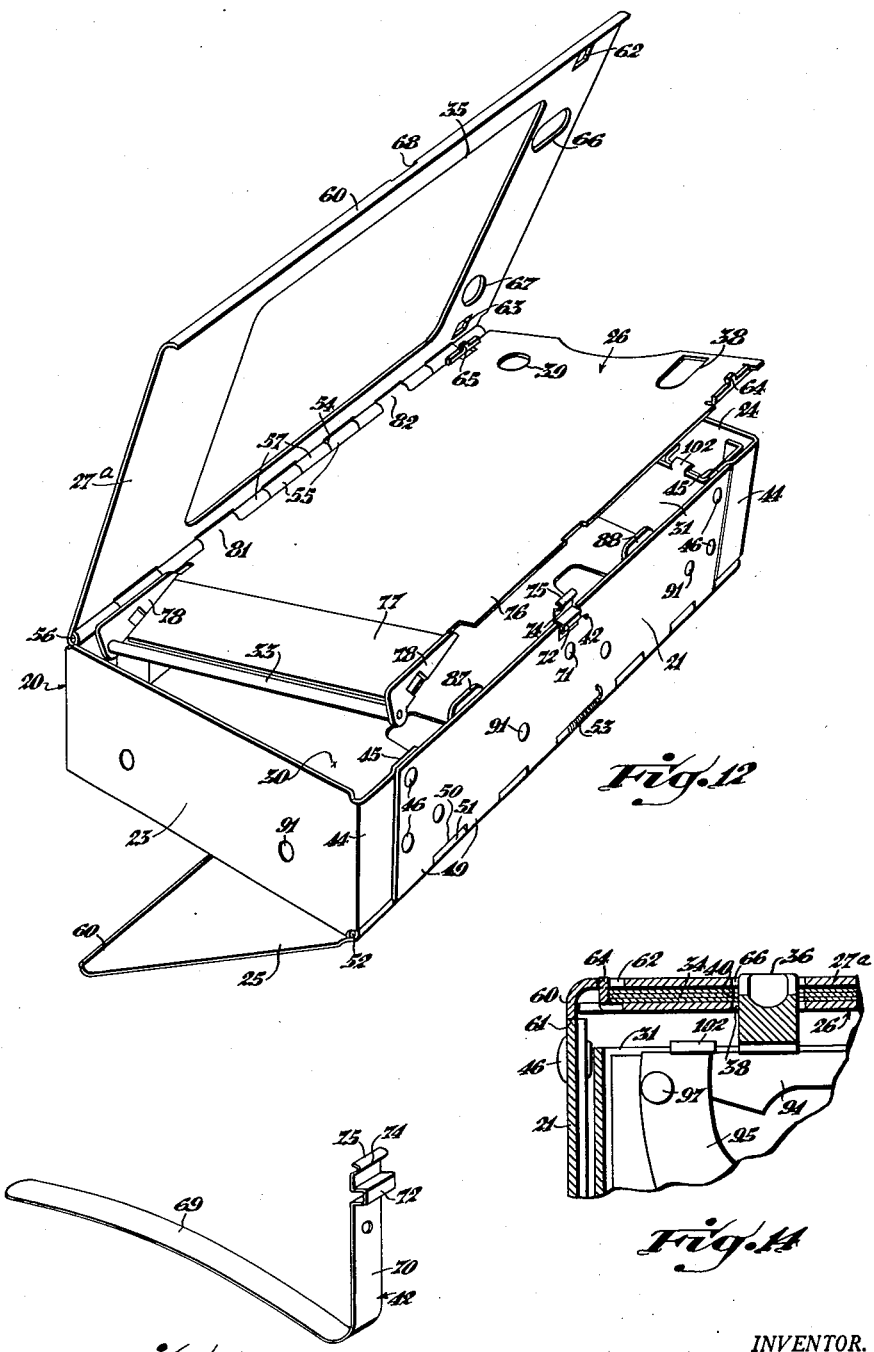
INVENTOR.
Harry J. Waechter
BY
Wood, Arey, Herron & Evans
ATTORNEYS Patented Sept. 11, 1951

2,567,305

UNITED STATES PATENT OFFICE 2,567,305

AUTOGRAPHIC REGISTER

Harry J. Waechter, Mount Healthy, Ohio, assignor to Paul Benninghofen and F. B. Diesbach, Hamilton, Ohio, trustees Application March 15, 1949, Serial No. 81,565

3 Claims. (Cl. 282—6)

This invention relates to autographic registers of the type used by department store sales personnel to prepare receipts, credit memorandum and records of sales transactions. These machines serially expose a connected strip of blank manifold forms on a writing platen in a position convenient to the salesperson who records the sales transaction on the exposed form. After the record is made, the machine dispenses the original and several carbon copies of the form. Usually the original is given to the customer as a sales receipt or credit memorandum and the copies are filed in a convenient compartment in the machine.

It has been determined that department stores and similar retail establishments prefer to utilize autographic registers, which are extremely durable and involve little upkeep and replacement cost, rather than sales books, which are inconvenient to use and must be replaced frequently. In fact, in many stores, heavy, counter-type autographic registers are employed. Unfortunately, these registers, as constructed in the past, are too heavy for a salesperson to carry as he moves about the store and, because of their complex construction, are too expensive to be issued to each member of the sales staff. Consequently, one counter-type autographic register is usually supplied to each department and it is necessary for the salesperson to return to the counter to record each transaction. During rush periods, the salesman must often stand in line, waiting until other salespeople record different transactions before he can record his transaction and provide a receipt for the customer. For these reasons, the autographic register has never supplanted the sales book entirely.

This invention is predicated upon the conception of a light, portable autographic register which can be carried conveniently by the salesperson as he moves about the store. Moreover, this invention provides a compact register which, while retaining the advantages of the larger, more expensive registers, is nevertheless so inexpensive of manufacture that it competes successfully with the sales book. The principles of this invention are disclosed in the following description as embodied in a register comprising; a light sheet metal casing which provides a storage compartment for a folded strip of manifold forms, a writing platen, over which the strip is passed so that successive forms are presented to the operator for inscription, and mechanism for holding the endmost form of the strip on the platen in an exposed position which is convenient to the operator. This holding mechanism may be released from engagement with the strip, so the strip can be moved across the platen and the endmost form can be manually withdrawn or ejected from the register after it has been filled in. Preferably, the mechanism is of the type that is automatically actuated to arrest the movement of the strip when the following form comes into registry in the exposed position on the platen. In my copending application, Serial No. 80,890, filed March 11, 1949, and entitled Arresting Means for Autographic Registers, now Patent 2,536,013 issued December 26, 1950, I have disclosed an improved mechanism for aligning the forms on the platen and arresting the movement of the strip across the platen. This mechanism gives eminently satisfactory results and is preferred. However, this invention is directed primarily to the register casing and it should be understood that any suitable form arresting and aligning mechanism may be used in conjunction with this casing.

One of the principles upon which this invention is founded consists in an improved casing design which permits the casing to be built by fabricating the major complementary elements of the casing such as the two side walls, the two end walls and the bottom and lid from pairs of identical sheet metal stampings. Thus, the side walls constitute one pair of complementary elements, the end walls another pair, and the lid and bottom still another pair. Each element is designed and dimensioned so that the blank from which it is formed is identical with the blank from which the complementary member of the pair is formed. This permits the utilization of a single forming die to cut the blanks for both members of the pair and also to shape the blanks into the same basic configuration. While, in the final form, one member of the pair may differ in structural detail from the other member, these differences may be imparted by passing the respective members through a second forming operation where a second die cuts and shapes the basic blank into the final form. Since the parts are so designed that they are practically identical, the major shaping and forming can be accomplished by the first die. Hence, if a second forming operation is necessary, it can be accomplished by a simple, relatively inexpensive die. Moreover, this process permits the manufacturer to produce the blanks in large quantity lots. These blanks may be stored and altered in accordance with the demand for the respective parts. Thus, not only is the initial die cost reduced, but the number of forming operations is minimized and substantial savings are accomplished by large lot production.

In register casings of the type concerned here, it is desirable to hinge the top and bottom closure members so that these members can be opened to permit access to various compartments of the register. Accordingly, it has been customary to provide a hinge mounting for the lid on the top edge of one of the walls and a hinge mounting for the bottom on the bottom edge of one of the walls. Moreover, since the writing platen is disposed between the lid and the interior of the casing, it has been conventional to mount the writing platen on separate hinges fixed on another part of the casing so that the platen may also be swung out of position, permitting access to the interior of the container.

An important feature of this invention is the provision of a basic side wall blank, one longitudinal edge of which is prepared to provide integral hinge elements. The hinge elements may be adapted to cooperate with similar hinge elements on the bottom to provide a hinged mounting for the bottom or they may be adapted to cooperate with hinge elements on the lid and writing platen to provide a hinged mounting for the lid and writing platen. The construction of the hinge elements on the respective side walls may be identical, or they may be altered slightly with respect to each other in a second operation if it is desired to hinge the respective elements in a slightly different manner. In the latter case, the side wall, which provides the hinged mounting for the bottom, is practically identical with the side wall which provides the hinged mounting for the top and writing platen. In either instance, however, the side wall which hinges the bottom is inverted with respect to the side wall which mounts the lid and writing platen so that the hinged edge of one side wall is at the bottom of the container, while the hinged edge of the other side wall is at the top of the container. Thus, the same basic blank may be used for both side walls.

An additional feature of this side wall construction is the provision of a novel hinge structure which permits the lid and the writing platen to be hinged on a common axis in such a manner that the respective planes of the lid and the platen can be disposed in spaced parallelism. Hence, although a single hinge is provided for both the lid and platen, these parts are spaced apart in substantially parallel relationship to each other when they are closed, to permit the strip to be passed between them. The resulting structure is not only more compact and simple of manufacture, but the need for separate hinged mountings for the lid and writing platen is obviated and a substantial savings in manufacturing costs is achieved.

This invention also provides new and improved form guides on the writing platen. Some autographic registers have been provided with form guides which project upwardly from the face of the writing platen and terminate slightly below the lid. In manually operated machines where the operator draws the strip across the writing platen, he often exerts a lateral pull on the strip so that the forms ride over the guides and become wedged between the guides and the lid, thus jamming the machines. The guides of this invention form, in conjunction with the lid and the platen, a four-sided frame which is completely closed on all sides; thus, positively precluding the possibility of the forms becoming wedged between the guides and the lid.

Other objects and advantages of this invention will be apparent from the following detailed description and drawings, in which:

Figure 1 is a top perspective view of the improved autographic register of this invention.

Figure 2 is a vertical sectional view through the register taken along line 2—2 of Figure 1.

Figure 3 is a fragmentary sectional view taken along line 3—3 of Figure 1, but showing the lid and writing platen in the open position.

Figure 4 is a horizontal sectional view along line 4—4 of Figure 2.

Figure 5 is a vertical transverse section of the casing taken along the line 5—5 of Figure 4.

Figure 6 is a vertical transverse section of the casing taken along line 6—6 of Figure 2 and showing the aligning pin actuating mechanism with the pins in form arresting position.

Figure 7 is a transverse vertical section similar to Figure 6 showing the pins depressed from engagement with the form apertures.

Figure 8 is a fragmentary longitudinal vertical section taken along line 2—2 showing part of the casing and the arresting mechanism when the pins are in the depressed position.

Figure 9 is a vertical section taken along the line 9—9 of Figure 1 but showing the arresting pin in the depressed position, prior to its movement upward in arresting engagement with the form aperture.

Figure 10 is a view similar to Figure 9 showing the arresting pin about to enter the aperture.

Figure 11 is a sectional view similar to Figure 9 showing the arresting pin in engagement with the form aperture.

Figure 12 is a perspective view of the autographic register with the lid, writing platen and bottom in the open position.

Figure 13 is a perspective view of the spring which holds the carbon form copies in the storage compartment and also latches the lid in closed position.

Figure 14 is an enlarged view of the form guides on the writing platen taken along line 14—14 of Figure 1.

A comprehensive exposition of the complete autographic register of this invention is found in Figures 1, 2 and 12. The register casing indicated generally at 20 consists of side walls 21 and 22, end walls 23 and 24, a bottom 25 which is hinged on the lower edge of side wall 21, a writing platen 26 and a frame-type lid 27a. The lid and platen are hinged on a co-axial mounting on the upper edge of side wall 22. The interior of the casing is divided into three compartments 27, 28 and 29 by a horizontal platform 30 and a vertically extending bracket 31 mounted near the forward end of platform 30. Compartment 27, in the upper part of the casing, serves as a storage bin for a folded strip 32 of connected manifold forms. The end of the strip 32 is unfolded, passed around a roller 33 and over writing platen 26 where the endmost form 34 of the strip is held on the platen and in registry with a window 35 in the lid by means of two aligning pins 36 and 37 which project through slots 38 and 39 in the platen and engage filing holes 40 in the form. These pins 34 and 35 may be depressed out of engagement with the holes in the apertures to permit the strip to be moved across the platen and the end form to be withdrawn from the end of the casing after it has been filled in by the salesperson. Suitable pin actuating mechanism 41, housed in compartment 28, is provided to return the pins toward the position of engagement with the form apertures and arrest the movement of the strip when the holes in the following form come into alignment with the pins. Compartment 29 in the bottom of the casing, provides a filing receptacle for carbon copies of the filled-in forms which are held in an orderly manner against the bottom of platform 30 by means of a spring 42. Access to this compartment is obtained by swinging the bottom 25 about its hinges.

The detailed construction of the various elements of the casing proper is best seen in Figures 1 through 4 and 12. The major complementary parts of the casing structure such as the two side walls, the two end walls, and the bottom and the top are preferably fabricated from pairs of identical light gauge, sheet metal stampings. The respective complementary parts are designed so they may be shaped to the same basic configuration and dimensions with a single forming die. Thereafter, each member of the pair is subjected to a second forming operation wherein a second die so configurates the member that the structural details peculiar to only that member of the pair are formed therein. Hence, the end walls 23 and 24 each consist of a generally rectangular panel 43 flanked by two integral flanges 44 which project inwardly at right angles from the side edges of the panel. As best seen in Figure 3, these flanges have inwardly off-set lips 45 which abut the back surface of the edgewise margins of the side walls 21 and 22. The lips are fastened to the side walls by means of rivets 46 and are off-set to permit the side walls to reside in flush relationship with the flanges 44. It will be apparent that the basic configuration and dimensioning of these parts is the same. Thus, a single forming die can cut the respective parts and shape them to the same basic configuration. However, end wall 24 has a pressed-in recess 47 which permits the operator to insert his fingers into a cut-out portion 48 on the writing platen and grasp the undersurface of the edge of the end form when he desires to withdraw the filled-in form from the casing. This recess is formed in end wall 24 in a second operation in which a suitable die impresses the recess into the end wall panel. Naturally, since end wall 23 does not have this recess, it is not necessary to subject this part to the second forming operation.

The side walls 21 and 22 may also be fabricated by forming two identical blanks and then passing each blank through a second forming operation in which the configurations peculiar to each side wall are formed in the side walls. In substance, the side walls are essentially the same. However, side wall 21 provides the hinged mounting for the bottom 25 and side wall 22 provides the hinged mounting for both the lid 27a and the platen 26. The respective mounting means provided on the side walls are consequently different to permit side wall 21 to mount a single member and side wall 22 to mount two members. One longitudinal edge of each side is configurated to provide a series of alternate recesses and straps. The straps are overturned into a generally circular formation to provide a series of spaced aligned loops 49 which constitute the hinge elements. The recesses 50 in side wall 21 receive spaced loops 51 integral with bottom member 25. These loops are aligned with the loops in side 21 and an elongated hinge pin 52 passes through all of the loops. Thus, it will be seen that the bottom is free to pivot about the hinge pin. A spring 53, anchored in both the side wall and the bottom, is coiled about the pin and constantly forces the bottom into the closed position. The bottom may be opened against the spring pressure by the salesperson when he desires to store the forms in the compartment 29.

The edge of side wall 22 which provides the hinged mounting for the lid and writing platen is configurated in the same general manner as the hinge edge of side wall 21. It also provides a series of alternately spaced apertures 54 and straps 55. These straps are formed into loops journalling an elongated hinged pin 56. Straps 57, integral with the lid, are formed into loops which reside coaxially with the loops 55 of the side wall and also receive the hinge pin. In the preferred embodiment, the writing platen also has integral hinge loops 58 spaced between the loops of the side wall 22 and the loops of the lid. Thus, although the lid and the writing platen are hinged on a common axis, the lid and the platen may be swung about that axis independently of each other. When it is desired to open the lid to adjust the form on the platen, the lid alone may be swung back. However, when it is desired to obtain access to the strip storage compartment 27, both the lid and the writing platen may be swung about the pivot and the compartment is exposed to permit the replacement of a new strip of manifold forms. It will be observed that, while the spacing and size of the straps and loops on the respective side walls are slightly different, nevertheless, the basic blank for each side wall is the same and may be cut with a single forming die. The respective apertures and loops which are different in each side wall can be formed in a second operation by a second forming die.

The lid 27a and the bottom 25 may also be formed from identical blanks. These parts generally comprise a rectangular panel having one longitudinal edge configurated to form spaced loops and straps as previously described. The other longitudinal edge of each part is upset to provide a gently curved lip 60, the edge of which abuts the longitudinal edge 61 of the opposite side wall. It will be noted that these lips, along with the curved hinge elements, present smoothly curved surfaces on all longitudinal casing edges. Besides increasing the over-all appearance of the register, this construction permits the operator to handle the register safely and comfortably. The lid has a large window which exposes the form positioned on the writing platen, two slots 62 and 63 through which the form guides 64 and 65 project upwardly from the writing platen and two apertures 66 and 67 which pass the form aligning pins 36 and 37.

The lid lip is also provided with a latch slot 68. A latch spring 42 projects through this slot and holds the lid in closed position. This spring is of particularly novel configuration and serves a dual function. As best seen in Figures 1, 5 and 13, the spring consists of a horizontally disposed flexible arm 69 which resides in compartment 29 and serves to hold the retained copies of the forms against the bottom of platform 30. The spring is bent upwardly from the horizontal arm to provide a vertical arm 70 which serves to latch the lid in the closed position. The spring is fastened to the side wall 21 of the casing by means of a rivet 71. It will be observed that the horizontal arm 69 is free to flex from the rivet while the upper part of the vertical arm 70 is also free to flex from the rivet independently of the horizontal arm. Thus, flexing of either arm does not affect the other arm, and the latch may be operated without releasing the hold of the horizontal arm on the copies. The upper arm is configurated into a lateral loop 72 which normally projects through a slot 73 in the side wall. The end of the upper arm is twisted into a catch 74 which passes through latch slot 68 and engages the edge of the slot, holding the lid in closed position. When it is desired to unlatch the lid, the salesperson presses inwardly on loop 72 which causes the upper arm to flex inwardly from the rivet 71 and the catch 74 to become disengaged from the latch slot. As the lid is closed, the lid lip 60 engages the inwardly turned catch end 75 and cams it inwardly until it passes through latch slot 68. The spring will then force the catch into latching engagement with the lid in the position illustrated in Figure 5. This latch does not directly act on the writing platen to keep it in closed position. However, when the lid is closed and latched, the writing platen must necessarily remain closed.

The writing platen consists of a generally rectangular table 76 having an angularly inclined ramp 77 at its rear end. The ramp is flanked by brackets 78 which journal a roller 33. Removable spring leafs 80 extend between the brackets and space the various sheets of the manifold form. These leafs serve as retainers for carbon paper sheets which extend from them over the writing platen and between the form sheets. This construction is not described in detail since it is familiar to those skilled in the art.

The platen is hingedly mounted in the upper edge of side wall 22 by means of two hinge loops 81 and 82. These loops are curved upwardly from the table edge so their axis extends above the plane of the table. The hinge loops of the lid curve downwardly from the lid edge and their axis is below the plane of the lid. Thus, although the hinge loops of the lid and the hinge loops of the table are coaxially mounted on the same hinge pin, the platen will be spaced in parallel relationship to the lid when the lid and platen are closed to provide a space for the passage of the manifold forms therebetween.

A particularly novel feature of this invention resides in the construction of the form guides 64 and 65 which are struck upwardly from the forward side margins of the platen. As best seen in Figure 6, these guides project through apertures in the lid when the lid is in closed position and may, if desired, extend slightly above the lid. The guides in combination with the platen and the lid, form a rectangular frame which is completely bounded on all four sides. It is impossible for the forms to ride over the guides and become wedged between the guide tops and the lid. Thus, even though the salesperson, in his haste to remove the forms from the register, exerts a lateral pull on the forms, they will not ride over the vertical guides and become wedged, jamming the margin, but will be confined in their proper channel.

The platen 26 is supported in correct horizontal position by contact of the forward edge of the platen with the top edge of the side wall and by the contact of the central portion of the platen with the top edges of four strip guides 85, 86, 87 and 88 struck up from the floor of the platform 30. These vertically extending guides are spaced slightly from the side wall of the register and centrally locate the folded form stack in the compartment 27. The platform itself is provided with end and side flanges, 89 and 90, which are secured to the side and end walls by means of rivets 91. The bracket which supports the pin actuating mechanism is provided with a foot 92 which is, in turn, secured to the platform by means of rivets 93.

In the construction shown, the bracket 31 supports the form arresting mechanism. A representative form arresting mechanism is shown in Figures 6 through 12. This mechanism is preferred since it effects simultaneous withdrawal of both aligning pins and gives eminently satisfactory results. However, it should be understood that any other suitable arresting and aligning mechanism may be employed with the autographic register of this invention. The pins 36 and 37 are mounted at the ends of arms 94 and 95 which are respectively pivoted on pins 96 and 97 fixed on the opposite side portions of bracket 31. A tension spring 98 extends between the two arms, being fastened to anchor pins 99 and 100 arranged near the central portion of each arm. This spring tends to urge both of the arms and the arresting pins upwardly in arcuate movement about the pivot pins 96 and 97. Stop lips 101 and 102 are provided on the bracket 31 and the upward movement of the levers and the arresting pins is stopped when the abutments 103 on the levers contact these lips.

In order to obtain coactive movement of the arms, arm 95 is provided with a cam stud 104 which extends through an obliquely angled cam slot 105 formed in arm 94. The projecting end of this stud is upset to provide an annular flange 106 which embraces the backface of arm 94, thus preventing the stud from being sprung out of engagement with the slot. The bracket 31 is cut-out, as at 107, to receive the flange and the flange is free to move in the cut-out portion without rubbing or interfering with the bracket. Hence, it will be observed that when pin 36 is depressed from engagement with the form holes by means of a pencil 108 or other suitable instrument, arm 94 pivots about pin 96 and cam slot 105 forces cam stud 104 downwardly, thereby causing the simultaneous downward movement of arm 95 and the withdrawal of pin 37 from engagement with the apertures. During this motion, stud 104 slides in slot 105 and tension spring 98 is expanded by the diverging movement of anchor pins 99 and 100. When the pencil is removed and pin 36 released, spring 98 is free to contract and does so, forcing arms 94 and 95 to pivot upwardly moving the pins toward the arresting position.

The pins 36 and 37 are of different configuration, pin 36 being constructed in such a manner that it sockets the pencil and permits the pencil to be slid forwardly, forcing the form over the writing platen until an edge of the form projects beyond the casing, thus giving the operator a finger hold on the form. As best seen in Figures 7 and 8, the head of this pin is configurated to provide a socket 109 which receives the point of the pencil or other instrument. A ledge 110 extending from the bottom of the pin head is grooved to provide a channel or slide-way 111 coextensive with the bottom of the socket and along which the pencil point may be drawn. Since the slots 39 and 66 in the platen and lid, respectively, are elongated and do not interfere with the movement of the pencil, the pencil may be pushed forward, carrying the form with it, until an edge 112 of the form projects beyond the edge of the casing where it may be grasped by the operator.

In my co-pending application, Serial No.

80,890, filed March 11, 1949, for Arresting Means for Autographic Registers now Patent 2,536,013 issued December 26, 1950 I have described and claimed a new and improved arresting pin. This pin is described generally in this application, reference being made to the above application for a detailed description. This pin 37 is formed with a projecting edge 113 which extends above the remainder of the pin head. Consequently, when the pencil has been withdrawn from contact with pin 36 and both pins move upwardly under the action of the spring, only the projecting edge 113 of pin 37 engages the undersurface of the moving strip. Thus, this edge is free to snap into engagement with the filing hole as soon as the holes come into alignment with the edge. The remainder of the pin head does not contact the surface of the moving strip, and consequently, engagement of the projecting edge is immediate and is not delayed until the hole is in alignment with the entire head.

Thus, after a salesperson has recorded a transaction on a form and he desires to remove the form from the register, he inserts the pencil 108 in a socket 109 of pin 36, pushes the pin downwardly and causes simultaneous disengagement of both pins from the filing holes of the form. The operator then pushes the pencil forward along the channel 111. The form is carried forward with the moving pencil until the form edge 112 projects a short distance beyond the casing. This projecting edge is then grasped by the operator who removes the pencil from engagement with the pin and the holes of the form. After the pin has been removed, both pins tend to move upwardly under the action of spring 98 and the projecting edge 113 of pin 37 engages the bottom of the form. The operator then draws the form rapidly across the writing platen until the entire form is outside of the casing and the next form is in alignment on the platen, at which point the strip movement is arrested by the engagement of pin 37 with the holes in the following form.

Having described my invention, I claim:

1. The combination, in an autographic register, of a writing platen over which a strip of connected manifold forms may be passed, each of said forms having a hole therein, strip arresting means including a depressible pin for cooperation with said holes to control the travel of the strip over the platen, a pair of form guides fixed to said platen adjacent said pin and projecting upwardly from said platen, said guides being spaced to confine the travel of the strip between them and prevent lateral displacement of said strip whereby successive holes in the strip are alignedly positioned to be sequentially engaged by said arresting means, a lid for said casing, said lid being movable into closed position in spaced parallel relationship with said platen and movable out of said closed position to expose said platen, said lid having spaced apertures to receive said form guides in interfitting engagement, whereby upon closing of said lid said guides are engaged in said apertures and whereby said lid, platen and guides form a closed frame to contain said strip and prevent said strip from becoming wedged between said guides and said lid even though a lateral pull is exerted on said strip.

2. In combination with an autographic register casing which has a discharge end from which severed portions of a strip of paper may be removed: a substantially planar writing platen member over which a strip of paper forms may be passed, a lid member for said casing, said lid member being movable into a closed position in spaced parallel relationship with said planar member, a pair of form guides fixed to one of said members adjacent the discharge end of said casing and projecting toward the other member, said guides being spaced apart to permit passage of the strip between them and to confine the strip in a predetermined path over the platen, the other member having correspondingly spaced apertures to receive said form guides in interfitting engagement, whereby when said lid is closed said guides are engaged in said apertures and said lid, platen and guides form a closed frame to contain said strip and prevent said strip from becoming wedged between said guides and either of said members even though a lateral pull is exerted on said strip.

3. In combination with an autographic register casing of the type providing a storage compartment for paper forms: a closure element for said casing, a spring having a latch arm and a pressure arm disposed at substantially right angles to each other, the pressure arm extending into said storage compartment and flexibly arranged to releasably bear against and hold forms in said compartment, attaching means for securing the latch arm to said casing, the latch arm being configurated to provide a releasable, flexible latch for holding said closure element in closed relationship with said casing, each of said arms being flexible independently of the other of said arms, whereby said latch arm may be independently released from latching engagement with said closure element without affecting said form-holding pressure arm and said form-holding pressure arm may be independently released from holding engagement with forms in said compartment without affecting said latch arm.

HARRY J. WAECHTER.

REFERENCES CITED

The following references are of record in the file of this patent:

UNITED STATES PATENTS

| Number | Name | Date |
| --- | --- | --- |
| 939,287 | Miner | Nov. 9, 1909 |
| 1,293,347 | Corwin | Feb. 4, 1919 |
| 1,799,719 | Zimmer | Apr. 7, 1931 |
| 2,072,134 | Sherman | Mar. 2, 1937 |
| 2,121,830 | Sherman et al. | June 28, 1038 |
| 2,159,501 | Brenn | May 23, 1939 |
| 2,205,016 | MacDonald | June 18, 1940 |
| 2,220,429 | Soderberg | Nov. 5, 1940 |